United States Patent
Hlebovy

[11] Patent Number: 5,866,001
[45] Date of Patent: Feb. 2, 1999

[54] FILAMENT WOUND HOUSING FOR A REVERSE OSMOSIS FILTER CARTRIDGE

[75] Inventor: James C. Hlebovy, Chardon, Ohio

[73] Assignee: Essef Corporation, Chardon, Ohio

[21] Appl. No.: 701,024

[22] Filed: Aug. 21, 1996

[51] Int. Cl.⁶ .................................................. B01D 63/00
[52] U.S. Cl. ................... 210/321.6; 210/321.72; 210/321.74; 210/321.73; 210/321.8; 210/450; 210/456
[58] Field of Search ............................ 210/321.72, 321.6, 210/321.78, 321.8, 321.74, 321.83, 450, 456

[56] References Cited

U.S. PATENT DOCUMENTS

| | | |
|---|---|---|
| 3,533,509 | 10/1970 | Kudlaty . |
| 3,610,420 | 10/1971 | Sampson et al. . |
| 3,616,928 | 11/1971 | Rosenblatt . |
| 3,804,259 | 4/1974 | Riggleman et al. . |
| 3,843,010 | 10/1974 | Morse et al. ............................. 220/3.9 |
| 3,879,243 | 4/1975 | Medney . |
| 4,216,881 | 8/1980 | Rosman ..................................... 222/94 |
| 4,351,092 | 9/1982 | Sebring et al. . |
| 4,517,085 | 5/1985 | Driscoll et al. . |
| 4,599,170 | 7/1986 | Friedman et al. . |
| 4,701,258 | 10/1987 | Billiet et al. . |
| 4,743,366 | 5/1988 | Burrows . |
| 4,781,830 | 11/1988 | Olsen ................................. 210/321.83 |
| 5,108,604 | 4/1992 | Robbins ............................. 210/321.74 |
| 5,128,037 | 7/1992 | Pearl et al. ......................... 210/321.74 |
| 5,227,062 | 7/1993 | Olsen . |
| 5,354,464 | 10/1994 | Slovak et al. . |
| 5,562,827 | 10/1996 | Schmidt et al. .................... 210/323.74 |

*Primary Examiner*—Ana Fortuna
*Attorney, Agent, or Firm*—Pearne, Gordon, McCoy & Granger LLP

[57] ABSTRACT

Disclosed is a housing for a reverse osmosis filter. The housing is preferably cylindrical and features a unique sealing assembly at each of its ends. The end assemblies enable the interior of the housing to be readily accessed and securely sealed. Each end assembly can be provided with one or more inlet and/or outlet ports.

9 Claims, 7 Drawing Sheets

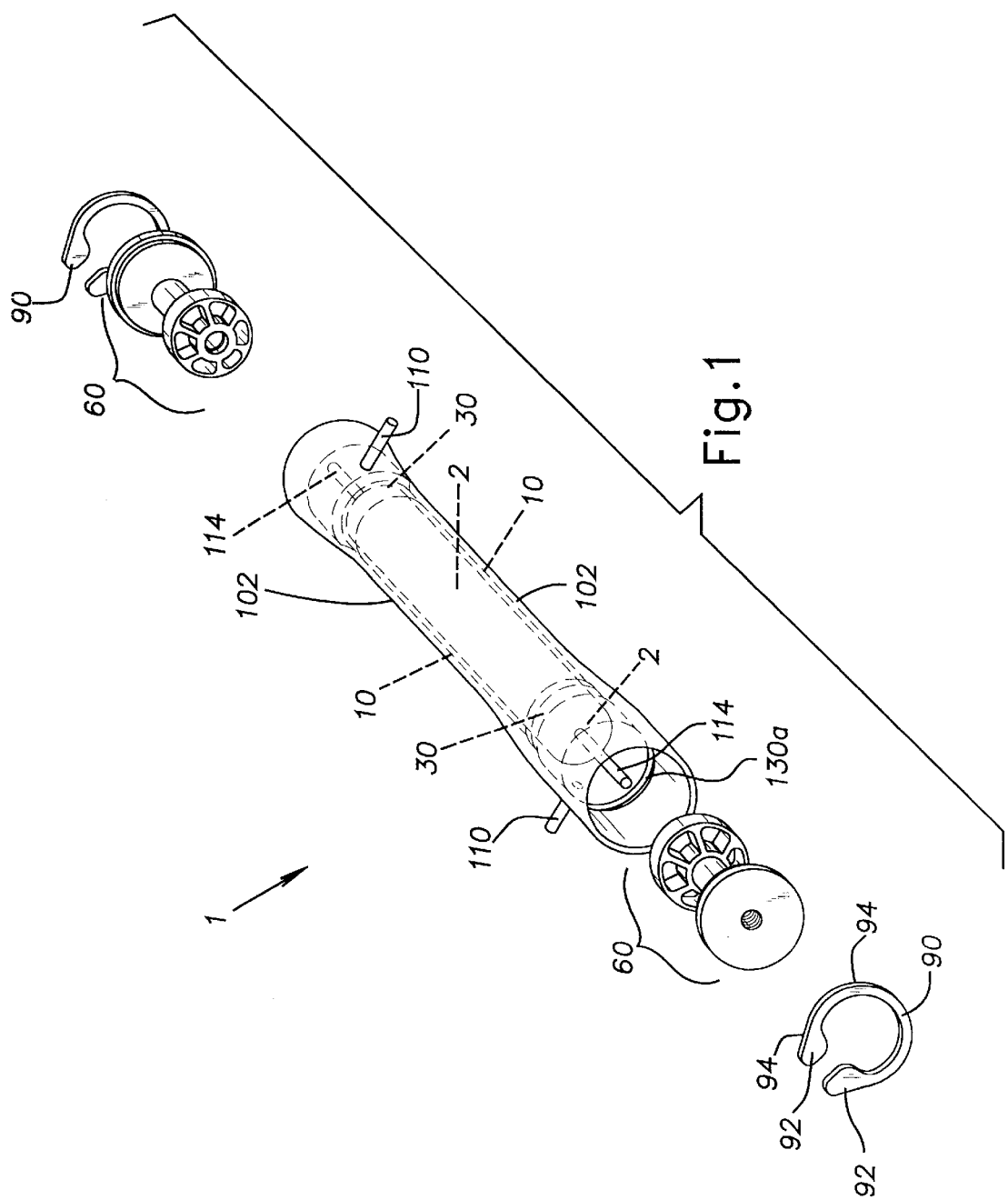

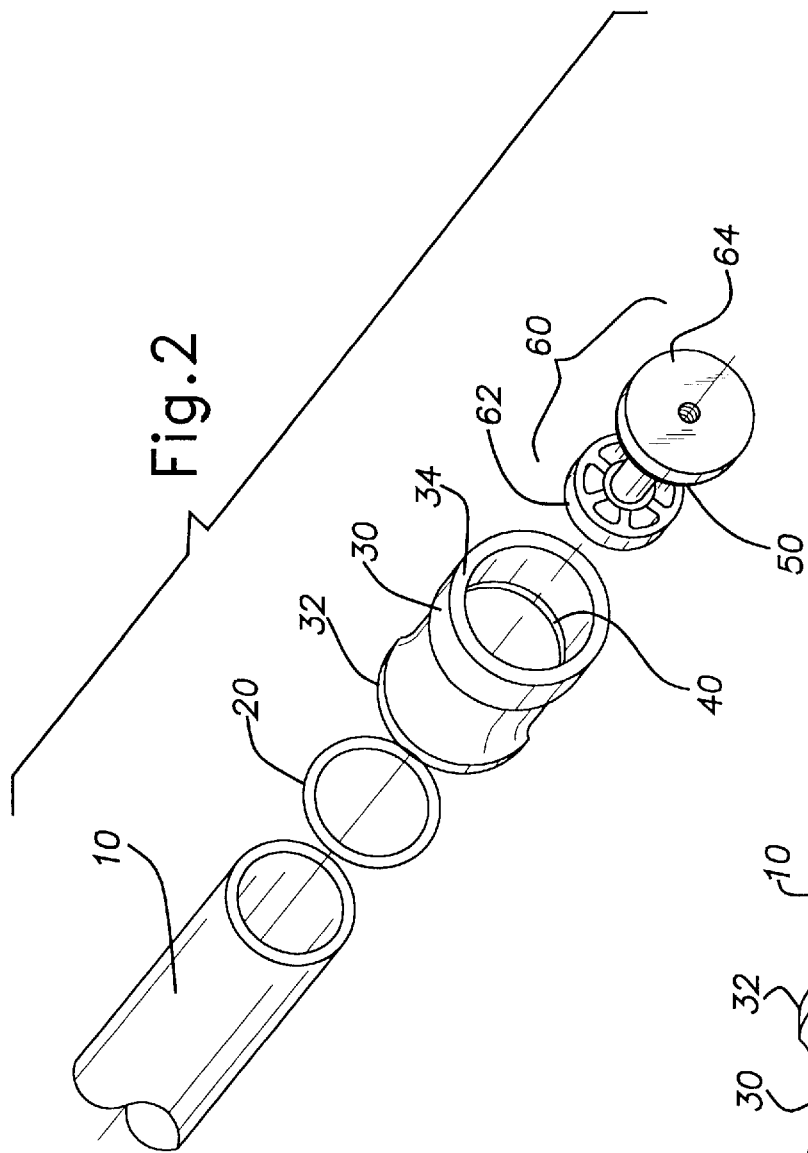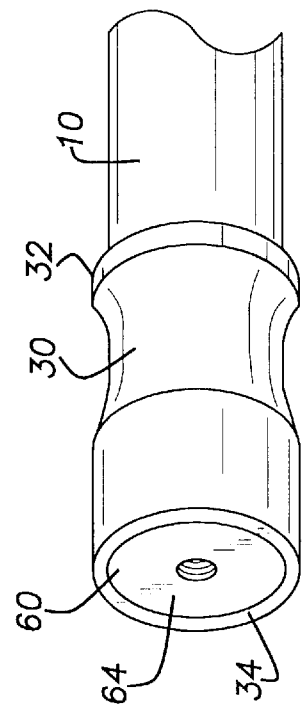

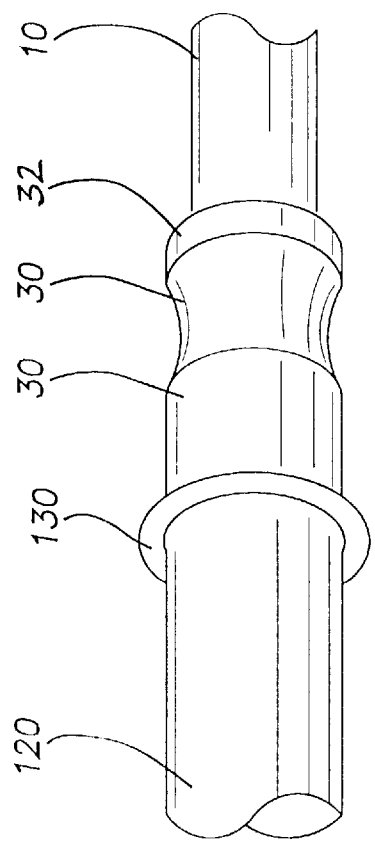
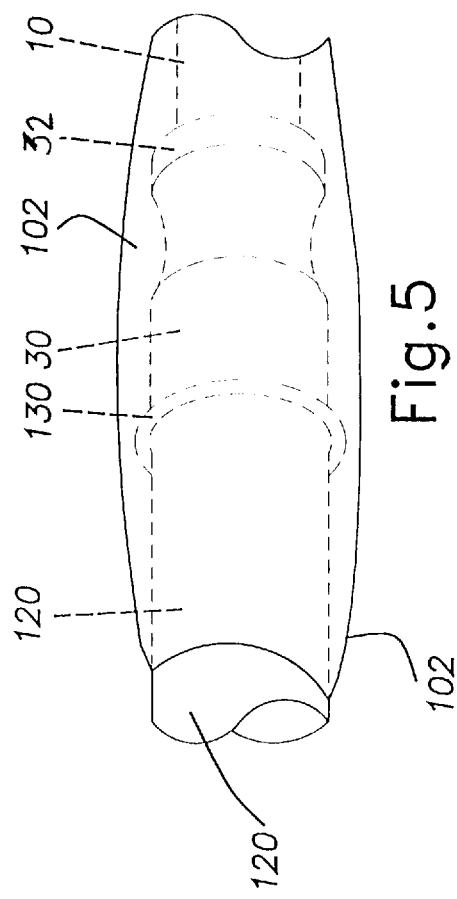

FILAMENT WOUND HOUSING FOR A REVERSE OSMOSIS FILTER CARTRIDGE

FIELD OF THE INVENTION

The present invention relates to a housing for a reverse osmosis filter cartridge. The housing utilizes a unique assembly at each of its ends for sealing and providing fluid connections to the housing ends.

BACKGROUND OF THE INVENTION

Reverse osmosis is a well-known process for the separation of solvent from a solvent-solute solution. The process utilizes a semipermeable membrane and high pressures to selectively diffuse solvent molecules through the membrane resulting in separation of pure solvent from the solvent-solute solution.

Reverse osmosis systems typically utilize a cylindrical filter having walls formed from a semipermeable membrane material. A solvent-solute solution, from which pure solvent is to be removed, is contacted with the outer circumferential membrane wall of the filter. Upon application of sufficient pressure to the solution and filter exterior, i.e. typically at least about 100 psi and often from about 500 psi to about 1500 psi, solution is driven toward the interior of the filter. Pure solvent is then typically collected from the ends of the filter.

Filter housings are provided for containing reverse osmosis filters. The housings are commonly formed from steel in view of the relatively high pressures existing within the housing during separation. As will be appreciated, steel housings are expensive and so have to some extent, limited the applicability and use of reverse osmosis systems.

Plastic filter housings have been introduced which although satisfactory in many respects, still present several significant drawbacks. Currently available plastic filter housings for reverse osmosis filters utilize end caps that are bonded or otherwise affixed to the filter housing. Such attachment renders accessing the interior of the housing exceedingly difficult. Even if an end cap is successfully removed without damaging the cap or housing, such as to replace a filter cartridge, the end cap must then be re-attached. Re-attached end caps are often susceptible to failure upon pressurization of the filter housing. Thus, there is a need for an improved end cap assembly that enables ready removal of an end cap and secure re-attachment thereof to a plastic filter housing, without a loss in the integrity of the housing upon reassembly.

Another drawback to currently known filter housings, metal or plastic, is the limited degree of installation flexibility. That is, except for custom designed housings and systems which are typically relatively expensive, commercially available housings are available in only a limited number of connection configurations. Thus, it would be desirable to provide a filter housing with an increased number of connection configurations.

SUMMARY OF THE INVENTION

The present invention achieves all of the foregoing objectives and provides a filter and housing assembly comprising a filament wound hollow housing having a sleeve member at one or both ends, a reverse osmosis filter, and end members adapted to fit within and sealingly engage a respective sleeve member to thereby sealingly enclose the filter. In another aspect, the invention provides a filter housing assembly comprising a tubular inner liner, a hollow cylindrical end cap aligned and disposed next to an end of the inner liner, an outer liner disposed upon the outer circumferential surfaces of the inner liner and the end cap and extending beyond the end cap to thereby define a sleeve, and a head adapted to fit within the sleeve and sealingly engage the end cap. In yet another aspect, the invention provides an assembly for retaining a filter element comprising a tubular inner liner, first and second hollow cylindrical end caps each disposed at an end of the inner liner, an outer liner disposed over the inner liner and the end caps, and first and second heads disposed within and sealingly engaged with the corresponding end caps.

BRIEF DESCRIPTION OF THE DRAWINGS

FIG. 1 is an exploded view illustrating the components of a preferred embodiment housing in accordance with the present invention;

FIG. 2 is an exploded view of one end of the preferred embodiment housing without an outer liner, illustrating in greater detail the primary components of the subject assembly;

FIG. 3 illustrates an end of the preferred embodiment housing when the components of FIG. 2 are assembled;

FIG. 4 illustrates an end of a partially assembled preferred embodiment housing abutted against a winding mandrel prior to formation of an outer liner;

FIG. 5 illustrates the assembly of FIG. 4 after deposition of an outer liner;

DESCRIPTION OF THE PREFERRED EMBODIMENTS

Figure 6:
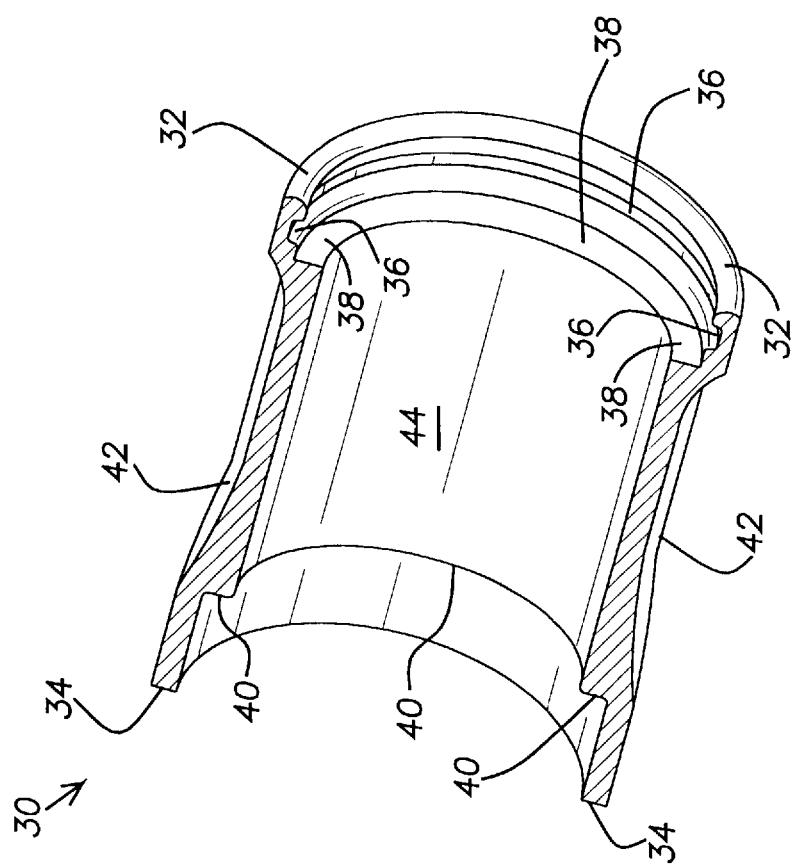
FIG. 6 is a perspective sectional view of an end cap component utilized in the preferred embodiment housing.

FIG. 1 illustrates the primary components of a preferred embodiment filament wound housing assembly 1 in accordance with the present invention. The housing 1 generally comprises a cylindrical hollow inner liner 10 having an outer liner 102 disposed about its periphery. The outer liner 102 is preferably formed by depositing a resin coated filament on the outer surface of the inner liner 10 by a process described below. The outer liner 102 is formed upon the inner liner 10 to provide two end regions or sleeves that extend coaxially from the ends of the cylindrical assembly, and that each receive an end cap 30, a head 60, and a snap ring 90. The filament wound housing 1 retains a filter cartridge 2 residing within the housing 1 and provides connections for one or more sideports 110 and/or one or more endports 114 to and from the filter 2. Typically, many commercially available replacement filter cartridges, i.e. filter 2, are provided with coaxially extending endports, such as endports 114.

Referring to FIG. 2 in which the outer liner 102 is not shown, the preferred configuration of each end of the housing 1 is as follows. The end cap 30 couples one end of the inner liner 10 to the head 60. A rear annular edge 32 of the end cap 30 is fitted over the circumferential periphery of one end of the inner liner 10. One or more sealing rings 20 may be used facilitate sealing between those components to prevent leakage. Likewise, the rear annular edge 32 of the end cap 30 is fitted over a rear face 62 of the head 60 and preferably around the circumferential periphery of the end of the head 60 proximate to the rear face 62. The head 60 is inserted within the end cap 30 a distance such that another sealing ring 50, disposed around the periphery of the head 60 proximate to the front face 64 of the head 60, engages a lip or ledge 40 formed along the interior periphery of the end cap and near a front annular edge 34 thereof, described in greater detail below. This arrangement provides a novel and unique end construction for a filter housing.

FIG. 3 illustrates in greater detail the assembled end portion of the preferred embodiment housing depicted in FIG. 2. As can be seen, the head 60 is fully inserted into the end cap 30 such that the front face 64 of the head 60 is flush with the front edge 34 of the end cap 30. FIG. 3 also illustrates that the rear edge 32 of the end cap 30 is disposed over the outer periphery of the inner liner 10.

The preferred embodiment housing 1 comprises an outer liner 102 that provides a hard rigid outer shell. The outer liner 102 is preferably formed by depositing, for example by filament winding techniques, a resin coated or resin impregnated plurality of fibrous strands about the outer periphery of the inner liner 10 and the end caps 30. As can be seen in FIG. 1, an important feature of the present invention is that the outer liner 102 extends significantly beyond the ends of the inner liner 10 and the end caps 30 and hence provides a sleeve disposed at each end of the housing 1.

Referring to FIG. 4, each sleeve is preferably formed by utilizing a winding mandrel 120 that abuts an end of the partially assembled inner liner 10 and end cap 30. Specifically, the end of the winding mandrel 120 abuts the front edge 34 of the end cap 30. Thus, when forming the outer liner 102, i.e. by depositing resin impregnated filaments when a filament winding technique is employed, the outer liner 102 is deposited or formed upon a portion of the winding mandrel 120. The winding mandrel 120 is preferably a cylindrical member having an outer diameter that is about the same as the outer diameter of the end cap 30 against which the mandrel 120 abuts. The outer surface of the winding mandrel 120 may be treated or coated to facilitate deposition of the material forming the outer liner 102. Upon completion of forming the outer liner 102, the winding mandrel 120 is removed from the wound assembly to thereby produce the noted sleeve extending coaxially at an end of the housing. Further in this regard, the outer surface of the winding mandrel 120 may be treated or coated to facilitate removal of the winding mandrel 120 from the resulting sleeve portion of the outer liner 102. Details of filament winding techniques are disclosed in U.S. Pat. Nos. 3,610,420; 3,804,259; 3,879,243; and 4,351,092, all of which are hereby incorporated by reference. Information pertaining to fibers and resin systems, manufacturing processes, and related matters is provided in "Filament Winding Composite Structure Fabrication", S. T. Peters, W. D. Humphrey, and R. F. Foral, Society for the Advancement of Material and Process Engineering, January 1991, which is also hereby incorporated by reference.

It is preferred to utilize a channel-forming member 130 disposed around the outer surface of the winding mandrel 120, preferably positioned toward or proximate the end of the namdrel 120 abutted against the front edge 34 of the end cap 30 to produce a recessed groove on the interior circumferential surface of the sleeve. Placing a channel-forming member 130 on the outer surface of the mandrel 120 prior to depositing the material forming the outer liner 102 results in the formation of a recess 130a in the interior circumferential surface of the sleeve having a configuration corresponding to that of the channel-forming member 130. The resulting recess 130a is utilized to receive the snap ring 90 described in greater detail below. The channel-forming member 130 can be in the form of a conventional O-ring.

FIG. 5 illustrates the assembly of one end of the inner liner 10 and end cap 30 abutted against the winding mandrel 120, upon formation of the outer liner 102. It can be seen from FIG. 5 that the outer liner 102 extends significantly ;beyond the end of the inner liner 10, the end cap 30, and the channel-forming member 130. In accordance with the preferred embodiment of the present invention, it is desirable to form the outer liner 102 so that it has an increased wall thickness at the ends of the housing 1. Typically, such thickness, as measured at each distal end portion of a sleeve, ranges between about ¼ inch to about ¾ inch. Greater or lesser thicknesses may be utilized if desired. Upon completion of winding or deposition of the outer liner 102, the winding mandrel 120 is removed from the assembly. The end portion of the outer liner 102 may be cut or otherwise machined to form the desired end configuration of the sleeve.

FIG. 6 is a sectional view of the preferred embodiment end cap 30. The end cap 30 provides a rear annular edge 32 which circumscribes the inner liner 10 in the assembled housing 1, the front annular edge 34 which faces outward from the end of the inner liner 10 in the housing 1 and receives the head 60, and an exterior circumferential surface 42 and and interior circumferential surface 44 both extending between the front and rear edges 34 and 32. Formed proximate to the rear edge 32, along the interior circumferential surface 44, is a channel 36 adapted to receive the sealing ring 20. Also formed along the channel 36, is a rear ledge 38 that serves as a stop when the end cap 30 is slid over an end of the inner liner 10 so that the rear edge 32 circumscribes the liner 10. That is, in the assembled housing 1, an end or edge of the inner liner 10 abuts or engages the rear ledge 38. With regard to the front of the end cap 30, it is preferred to provide a front ledge 40 formed along the interior surface 44, preferably proximate the front edge 34. The front ledge 40 provides a stop for the head 60 when it is inserted within the end cap 30.

Figure 7:
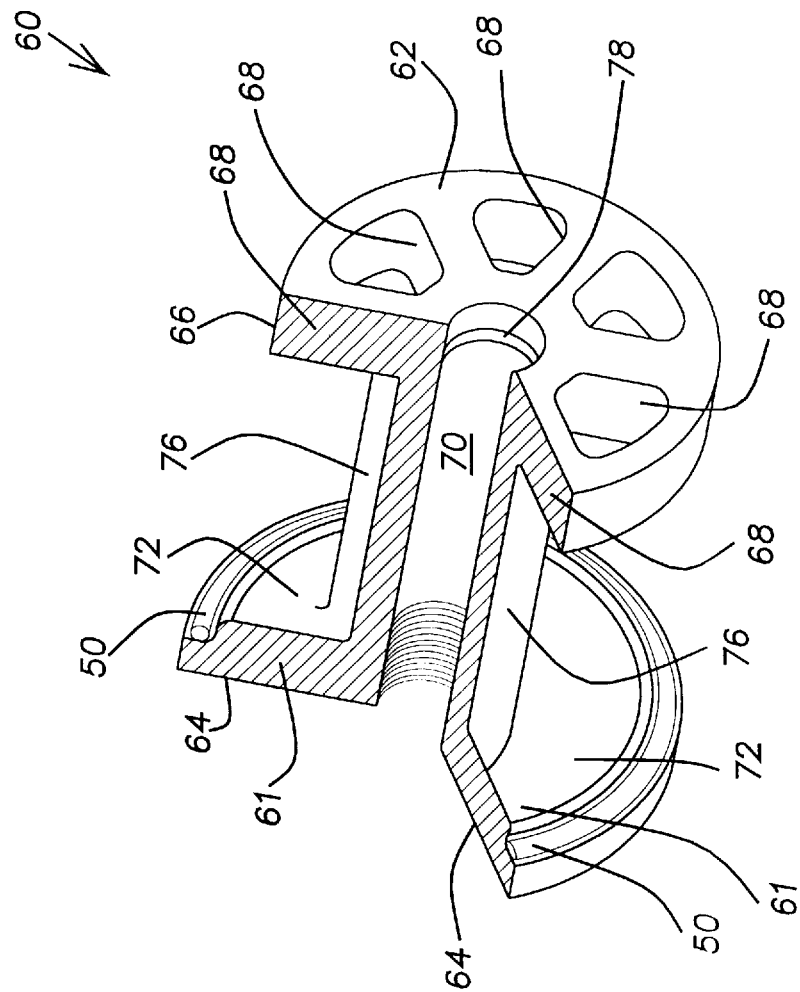
FIG. 7 is a perspective sectional view of a head component utilized in the preferred embodiment housing.

FIG. 7 is a detailed sectional view of the head 60 illustrating its preferred configuration. The head 60 comprises a support ring 66 that is disposed within the end cap 30 in the assembled housing 1, a sealing plate 61 disposed at the front edge 34 of the end cap 30 in the assembled housing 1, and a hollow, generally cylindrical bridge member 76 extending between the sealing plate 61 and support ring 66. The sealing plate 61 defines the front face 64 that faces outward from the end cap 30 in the assembled housing 1 and an oppositely directed sealing plate rear face 72. The support ring 66 defines the rear face 62 that is inserted within the end cap 30. The support ring 66 preferably includes a plurality of spokes 68 radially extending from one end of the centrally disposed bridge member 76 or interior region of the support ring 66 to an outer periphery of the ring 66. The hollow bridge member 76 defines a flow channel 70 extending from the rear face 62 to the front face 64 of the head 60. As explained in greater detail below, the flow channel 70 provides fluid communication between the support ring 66 and the sealing plate 61. The flow channel 70 also provides fluid communication between a region along the front face 64 of the sealing plate 61 and an endport 114 of the filter 2 (see FIG. 1) that is inserted within the channel 70 from the rear face 62. It is preferred to provide a sealing member 78 within the flow channel 70, such as along the interior surface of the channel 70 and preferably proximate the rear face 62. The sealing member 78 may be a conventional O-ring. The sealing member 78 is utilized to effectuate a seal around a filter endport 114 when the endport 114 is inserted into the flow channel 70. The head 60 also comprises the sealing 50 disposed about the periphery of the sealing plate 61 along or toward the front face 64 of the head 60 which facilitates sealing between the head 60 when inserted into the end cap 30.

The housing 1 is preferably assembled from two subassemblies. A first subassembly comprising (i) the inner liner 10, (ii) one end cap 30 disposed at one end of the first subassembly (the other end of the first subassembly being closed) or two end caps 30 each disposed at opposing ends of the first subassembly, and (iii) the outer liner 102 disposed upon the outer circumferential surfaces of the inner liner 10 and the end cap(s) 30, thereby providing a sleeve at one or both ends, is mated or engaged with one or two second subassemblies, each comprising-one or more head(s) 60 and corresponding snap ring(s) 90. The number of the second subassemblies utilized, corresponds to the number of end caps 30 utilized in the first subassembly, i.e. one or two.

A filter cartridge 2 is placed within the first subassembly, specifically, within the inner liner 10. In the event that the first subassembly comprises two end caps 30, engagement between the first and second subassemblies is accomplished by inserting a head 60 into each end of the first subassembly containing the filter 2, the support ring 66 of each head 60 being inserted first, so that the sealing plate 61 is received within the sleeve of the first subassembly. Each head 60 is further inserted into a corresponding end cap 30 so that the front face 64 of the sealing plate 61 is flush with the front edge 34 of the end cap 30. In the event the filter cartridge 2 comprises a centrally disposed coaxially extending filter endport 114, the endport 114 is inserted within the flow channel 70. Each head 60, disposed at the ends of the first subassembly, is then secured in place by inserting the snap ring 90 within the recessed groove 130a formed along the interior circumferential surface of a sleeve. As will be recalled, the recessed groove 130a is preferably formed by the channel-forming member 130 described in conjunction with FIGS. 4 and 5. With reference to FIG. 1, the snap ring 90 preferably comprises an arcuately shaped resilient and deformable member having two ends 92 spaced apart from one another, and an outer circumferential edge 94. The snap ring 90 is inserted within the recessed groove 130a by applying a compressive force at the ends 92, directing the ends toward one another, then placing the snap ring 90 within the groove 130a, and releasing the snap ring 90 whereby the resiliency causes the edge 94 of the ring 90 to engage the inner circumferential surface of the sleeve, specifically within the groove 130a. The snap ring 90 is dimensioned such that upon placement within the recessed groove 130a, at least a portion of the ring extends beyond the interior circumferential surface of the sleeve and toward the cylindrical or longitudinal axis of the housing such that the head 60 disposed on one side of the ring 90, is securely retained within the housing and cannot slide past the ring 90 toward the housing end.

Figure 8:
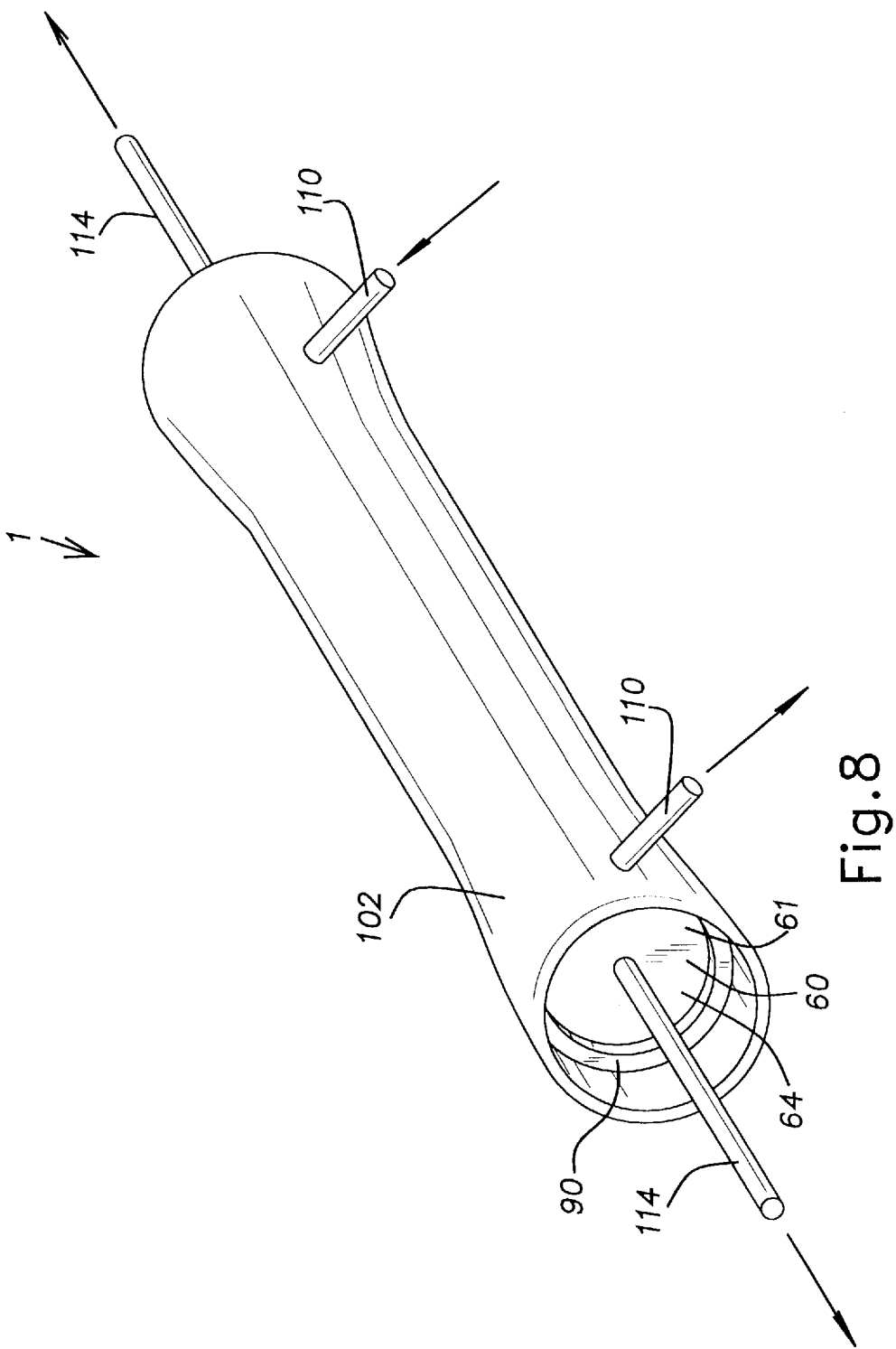
FIG. 8 illustrates typical flow directions of liquid entering and exiting the assembled preferred embodiment housing.
Figure 9:
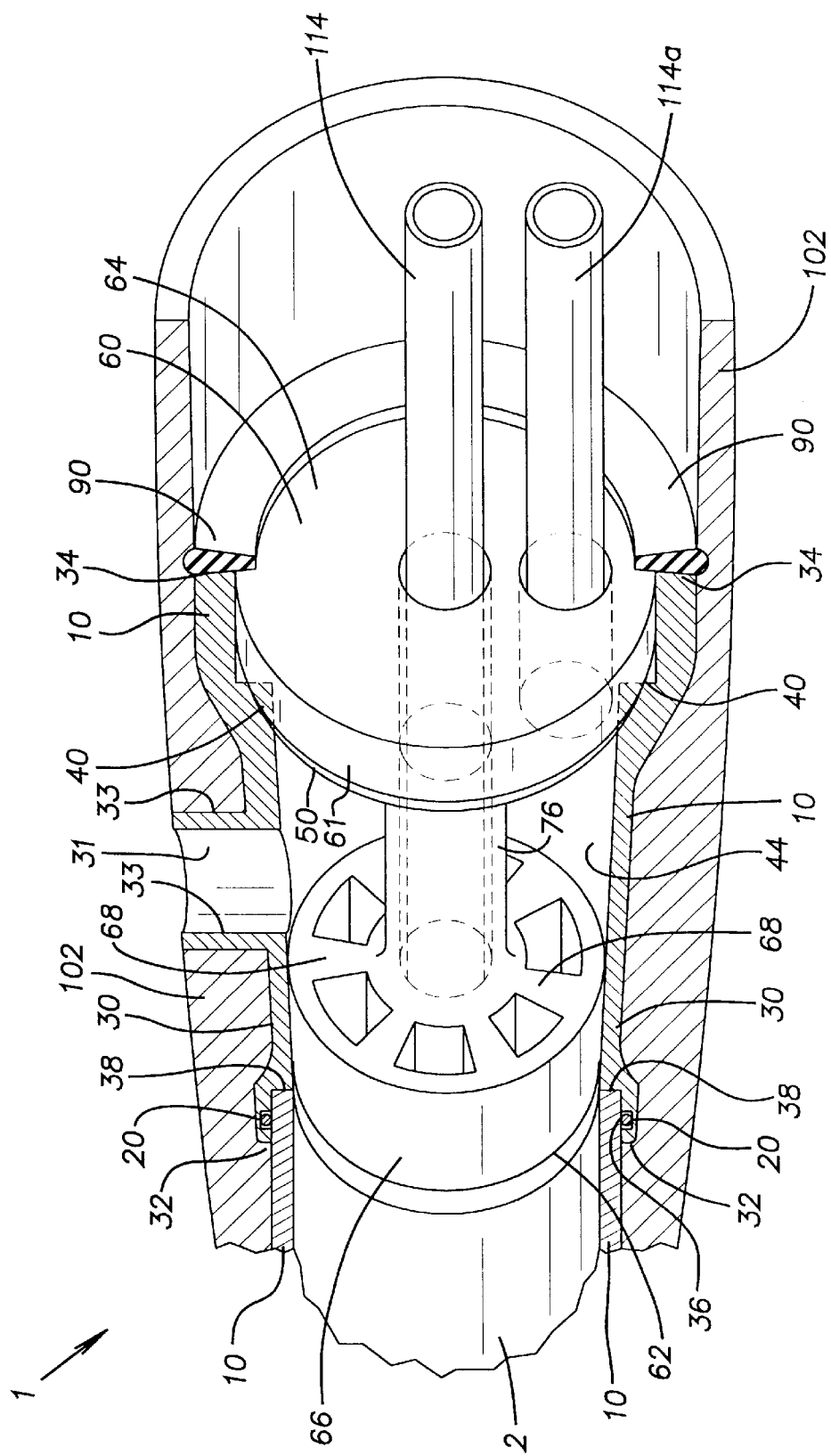
FIG. 9 is a perspective partial sectional view of one end of the preferred embodiment housing illustrating one possible configuration of side and endports.

FIG. 8 illustrates the assembled preferred embodiment filament wound housing 1. Typically, the housing 1 comprises a filter sideport 110 and a filter endport 114 at each end of the assembly. Although as previously noted, the filter 2 typically comprises endports 114 coaxially extending from each of its ends, the present invention housing 1 may provide additional endports 114a as illustrated in FIG. 9. That is, in addition to endports 114 coaxially projecting from the ends of a filter 2, the housing 1 may comprise additional supplemental endports 114a extending from one or both ends of the housing, such as from the front face 64 of the head 60 and extending along an axis parallel but not coextensive with the longitudinal axis of the housing 1. Furthermore, the housing 1 may in some instances, not contain any sideports 110, but instead provide one or more openings through the housing side for connection with conduits or pipes such as might be existing at an installation site. In the event the housing 1 comprises one or more sideports 110, or openings in the sidewall of the housing 1, it is preferred that the sideport 110 or opening be located in the sidewall of the housing 1 between the sealing plate 61 and the support ring 66 of the head 60. The openings defined in the support ring 66 between the spokes 68 enable fluid flow between an end of the filter 2 and a sideport 110. As will be appreciated, the sealing plate 61 prevents fluid flow from an end of the filter,2 through an end or sleeve portion of the housing 1.

Sideports 110 or openings are preferably provided in the sidewall of the housing 1 by utilizing an end cap 30 having a corresponding number of access ports formed in the wall of the end cap 30, as shown in FIG. 9. A typical end cap access port is depicted in FIG. 9 as port 31 defined by a circumferential sidewall 33. The port 31 extends through the sidewall of the end cap 30 perpendicularly from the cylindrical axis of the end cap 30. The outer liner 102 is deposited around the sidewall 33. When forming the outer liner 102 by filament winding techniques, a plug or other member may be inserted within the port 31. It is most preferred to utilize a cone-shaped plug to insert into the port 31 whereby the cone portion of the plug extends above the outer surface of the outer liner 102, and which thereby guides filaments around the opening of the access port 31. Upon completion of filament winding, the plug is removed to reveal the access port-31 ready for accepting a sideport member 110.

The present invention includes embodiments in which only one filter sideport 110 or filter endport 114 is utilized on an end of the housing 1, or various combinations of a plurality of sideports 110 and a single endport 114 are used on an end of the housing 1. Moreover, multiple endports 114 and/or 114a may be provided and/or multiple sideports 110 can also be provided on an end of the housing 1. The present invention also includes embodiments in which only one end of the housing 1 contains one or more sideports 110 and/or endports 114 and/or 114a. Furthermore, the present invention includes a filter housing having additional ports for rinsing or flushing the filter, such as with a rinse solution or solvent.

It is particularly preferred to provide the following port configurations: (i) one sideport 110 and one endport 114 on each end of the housing 1; (ii) no sideports 110 and two endports 114 and 114a on each end; (iii) one sideport 110 and one endport 114 on one end and two endports 114 and 114a on the other end; (iv) one sideport 110 and no endport on one end and one sideport 110 and one endport 114 on the other end; (v) two endports 114 and 114a on one end and one endport 114 on the other end; (vi) two endports 114 and 114a on one end and one sideport 110 on the other end. When utilizing multiple endports 114 and 114a on one end, a first endport 114 can be located along the longitudinal or cylindrical axis of the assembly 1 and one or more other endports 114a can be located along the front face 64 of the head 60, and preferably oriented parallel to the first endport 114. It is contemplated that extra sideports or endports can be provided, and if not used, be blocked off or plugged.

It is important to note that the supplemental endports 114a, i.e. those that project from a front face 64 of a head 60 and that are parallel with a coaxially extending endport 114, do not generally provide access to the interior of the filter 2 as does a coaxially extending endport 114. Supplemental endports 114a typically provide the same function as the sideports 110, and service the same region proximate a filter end as do the sideports 110. When providing a supplemental endport 114a, it is contemplated that the function of the endport 114a will be to direct inflow or feed to the housing 1 and/or to direct sediment, particulate matter, and/or a waste stream from the interior of the housing 1.

The endports 114 and 114a and sideports 110 are sized to provide suitable flow rates to and from the filter 2 disposed within the housing. In addition, the ports are sized such that they readily connect to conventional plumbing and hardware. Typically, the ports will be from about ½ inch to about ¾ inch in diameter and can be threaded.

The filter housing can be nearly any size and take other forms besides the preferred cylindrical or tubular configuration described herein. It is most preferred that the housing be cylindrical and have a diameter sufficient to accommodate a 4 inch diameter reverse osmosis filter element.

A wide array of materials can be utilized for the various components of the housing 1 of the present invention. Nearly any inert plastic can be employed for the inner liner 10 such as, but not limited to polyethylene or polyvinyldiflouride. Other materials are contemplated for the inner liner 10 depending upon the end use requirements. If for example the housing 1 will contain a filter for processing a liquid for human consumption, the liner material should be in accordance with FDA requirements. The materials for the end cap 30 and head 60 are preferably selected to be the same as or similar, or at least compatible with the materials utilized for the inner liner 10. Other suitable materials for the end cap 30 and the head 60 include for instance polyvinyl chloride or various nylon alloys. The end caps 30 and heads 60 are preferably injection molded. As previously noted, all the sealing rings, i.e. rings 20, 50, and 78, can be in the form of conventional O-rings. Accordingly, they may be formed from known suitable elastomers such as EPDM. The snap ring 90 is preferably formed from a relatively rigid, yet flexible material, such as fiberglass, a strong thermoplastic, or a metal or alloy thereof.

Since the preferred embodiment assembly 1 utilizes a separate inner liner 10 that contacts the liquid undergoing filtration, the outer liner 102 does not contact that liquid. Therefore when working with liquids intended for human consumption for instance, the outer liner need not be formed from the same materials dictated by FDA requirements and health concerns, as the inner liner 10. This feature is of particular importance to the industry since it enables housings to be formed from a higher proportion of less expensive materials.

Although the preferred embodiment of the present invention filter housing comprises a filament wound outer liner, it is to be understood that the present invention includes housings that are not formed by filament winding techniques. Thus, the present invention encompasses a filter housing that is formed from one or more metals or alloys, such as for instance steel or aluminum, that utilize the end assemblies described herein.

Furthermore, while the foregoing details are what is felt to be the preferred embodiments of the present invention, no material limitations to the scope of the claimed invention are intended. Further, features and design alternatives that would be obvious to one of ordinary skill in the art are considered to be incorporated herein. The scope of the invention is set forth and particularly described in the claims herein below.

What is claimed is:

1. A filter and housing assembly, comprising:

an inner tubular liner having a filter cartridge housed therein;

an outer tubular liner adhered to said inner tubular liner and having a first sleeve member extending axially from a first end of said inner tubular liner;

an end cap disposed within said outer tubular liner and sealingly receiving said first end of said inner tubular liner;

a first sealing head disposed within said end cap;

an end port extending through said first sealing head and communicating with said filter cartridge;

a removable snap ring, said snap ring being removably secured within said first sleeve member adjacent said first sealing head and being operable to retain said sealing head in sealing engagement with said end cap;

whereby said snap ring may be removed for access to said filter cartridge by axial removal of said first sealing head.

2. The filter and housing assembly according to claim 1, wherein said outer liner is formed by a filament winding process.

3. The filter and housing assembly according to claim 1, wherein said filter cartridge is a reverse osmosis filter.

4. The filter and housing assembly according to claim 1, wherein said first sealing head comprises a support ring and a sealing plate, said support ring being disposed inwardly adjacent said inner liner and said sealing plate being in sealing engagement with said end cap.

5. The filter and housing assembly according to claim 4, wherein the sealing plate is engaged by said snap ring.

6. The filter and housing assembly according to claim 4, wherein said first sealing head further comprises a bridge member which extends between said support ring and said sealing plate.

7. The filter and housing assembly according to claim 6, wherein said first sealing head has a front face and an oppositely directed rear face, said bridge member defining a passageway extending from said front face to said rear face.

8. The filter and housing assembly according to claim 6, wherein said support ring defines at least one inlet passage to said filter which communicates with a chamber defined by an interior circumferential surface of said end cap between said support ring and said sealing plate, and wherein a side port through said end cap and said sleeve member communicates with said chamber.

9. The filter and housing assembly according to claim 6, wherein said support ring defines at least one inlet passage to said filter which communicates with a chamber defined by an interior circumferential surface of said end cap between said support ring and said sealing plate, and wherein an additional end port through said sealing head communicates with said chamber.

\* \* \* \* \*

UNITED STATES PATENT AND TRADEMARK OFFICE
CERTIFICATE OF CORRECTION

PATENT NO. : 5,866,001
DATED : February 2, 1999
INVENTOR(S) : James C. Hlebovy

It is certified that error appears in the above-indentified patent and that said Letters Patent is hereby corrected as shown below: On the title page, Item [56], References Cited, delete "5,128,037", and insert --5,127,037--

Column 3, line 62, delete "namdrel" and insert --mandrel

Column 4, line 10, before beyond, delete --;--

Column 4, line 29, delete second occurrence "and" and insert --an--

Column 4, line 33, after along, insert --the interior surface 44, preferably adjacent or near--

Column 5, line 19, after compromising, delete -- -- --

Column 6, line 17, after filter, delete --,--

Column 6, line 35, after port, delete -- -- --

Signed and Sealed this

Third Day of August, 1999

Attest:

Q. TODD DICKINSON

Attesting Officer

Acting Commissioner of Patents and Trademarks